3,296,021
HEAT-RESISTANT AND OXIDATIONPROOF
MATERIALS
Nils Gustav Schrewelius, Hallstahammar, Sweden, assignor to Aktiebolaget Kanthal, Hallstahammar, Sweden
No Drawing. Filed Nov. 24, 1964, Ser. No. 413,653
Claims priority, application Great Britain, June 25, 1962, 24,344/62
3 Claims. (Cl. 117—160)

The present invention relates to new and useful materials of the class essentially comprising silicon carbide and metallic silicides and methods of making such materials, preferably in the form of electrical resistance elements.

This application is a continuation-in-part of my application Serial No. 288,467, filed June 17, 1963, now abandoned.

The material according to the present invention is composed of a metal silicide and silicon carbide, said carbide constituting 30 to 99% by volume and said metal silicide 1 to 70% by volume of the solid material.

The proportional relation between the contents of silicide and silicon carbide in the heat-resistant material is of essential importance in respect of the characteristics intended to be attained. It has been found that even moderate amounts of silicide may have the effect of essentially improving, inter alia, the resistance of silicon carbide to oxidation at temperatures above 1300° C. Therefore, the invention covers materials with a silicon carbide content of up to 99% by volume.

The metal silicide consists of silicon and 30 to 90% by weight of molybdenum. In the metal silicide used the Si content should normally be high in order to render the silicide resistant to oxidation, and the applicant has found that the Si content of the silicide concerned should be at least 10% by weight. At lower contents than this the Si content will not be sufficient to be able to form an adequate protective layer of $SiO_2$ on the grain surfaces. Furthermore, applicant has found that the Si content should not exceed 70% by weight because, at higher Si contents, the melting point will be so low that the mixed silicide will be unusable for practical purposes. As a matter of fact, the melting point of the metal silicide in its state of equilibrium should be considerably higher than the designed operating temperature of the finished composition.

Comprised within the scope of the invention are all combinations of the above silicides with silicon carbide. However, $MoSi_2$ has a particular interest directed to it owing to the particularly satisfactory results attained with heat-resistant materials containing the same in combination with silicon carbide.

The present invention relates to a process of producing silicide bodies consisting of a silicon carbide skeleton with a pore-filling metallic binder component and characterized by having very low porosity.

Non-porous bodies of silicon carbide and a metal silicide have been produced powder-metallurgically by the pressure sintering method or the cold pressing method. In the former method bodies with up to about 60% SiC can be made while the latter method works satisfactorily only at lower SiC contents. A manufacture of bodies with more than 60% SiC could not be effected without serious difficulties.

The new method has for its object to avoid these difficulties and enable the production of oxidation and heat-resistant bodies with an overall porosity not exceeding 5%, preferably below 1%, as calculated on the total volume of the substance, and containing up to 99% by volume of silicon carbide, as calculated on the solid substance, together with a molybdenum silicide.

My invention comprises the steps of shaping a preliminary porous body consisting essentially of one or more members of a group consisting of hexagonal SiC, cubic SiC, graphite, amorphous carbon, and carbon-containing carbonizable material, heating a molybdenum-silicon alloy in the presence of, but not in direct contact with said preliminary body in a non-oxidizing atmosphere at a temperature above the melting temperature of said powder but below the decomposition temperature of SiC and for a time sufficient to infiltrate substantially all the pores in at least one coherent portion of said preliminary body with a part of said melted alloy.

The alloy is preferably a powder and instead of a molybdenum-silicon alloy, a mixture of molybdenum and silicon may be used. The amount of silicon in the alloy or powder is in excess of that corresponding to the formula $MoSi_2$.

It is believed that during the heating process, the excess silicon vaporizes at least to some extent, causing the body of the alloy or mixture of molybdenum and silicon to expand and thereby come into direct contact with the body and impregnate and infiltrate the pores of the body. Therefore, although the powder is initially out of contact with the body, it is sufficiently close so that on heating, the powder and/or the melted powder will expand into direct contact with the body. The degree of expansion of the powder mass will vary somewhat depending upon the depth of the bed, the particle size, the composition and the temperature. However, a suitable set of conditions can readily be selected by those skilled in the art. After the excess silicon has vaporized and some of the alloy has been absorbed by the body, the level of the alloy will drop so that it will be out of contact with the body.

In my copending application Serial No. 64,833 I refer to the difficulties caused by the tendency of molbydenum silicide to form an adherent rough crust or burr on the surface of the body during the infiltration process. According to the present invention the formation of such burrs is avoided by leaving a space between the powder and the body prior to the beginning of the heating process as described herein. When the level of the alloy drops due to depletion of the excess silicon by vaporization and absorption of some of the alloy into the body as described above, the tendency to form burrs on the body will also be removed.

The silicon carbide used for producing articles or bodies according to the invention may be obtained in several different ways. Thus, it is possible to use socalled α-silicon-carbide which may consist of crystal grains of sizes ranging from a few microns up to several millimeters. It is possible also to start from a very finely grained product called β-silicon-carbide and distinguishing from the α-type by having a cubic crystal structure. It is suitable, as a rule, that the grain sizes of the silicon carbide used vary within wide limits whereby a lower porosity of the SiC skeleton will be attained.

It is also possible according to the invention to form silicon carbide at least partly in situ in the bodies, for instance, by subjecting a skeleton of carbon and/or carbonizable material to silicidizing gases or to the action of fused silicon or silicide, or by treating a silicon skeleton with carbonaceous gases. It is possible also to start from a mixture of carbon and silicon which mixture is compacted and then sintered while forming silicon carbide. The skeleton body can thus be constituted by carbon only in any form, or by a mixture of carbon and silicon carbide. These procedures for forming the silicon carbide in the body are known per se in the prior art. It is further possible to combine this SiC-forming process with the infiltration process so that only one heat-treatment is necessary.

The production of the porous preliminary shaped body essential to the invention may be performed in many different ways which are each known per se, and therefore detailed directions as regards the production of the preliminary body will be given merely in the examples hereinafter. The composition and porosity of the preliminary body may vary within wide limits, but as a general statement the pore volume will have to constitute 15 to 60% of the volume of the preliminary body, and in this case the open pores should preferably have a maximum diameter of 50 microns. Such a limitation of the pore size is realized by the mixture mass preferably containing fine-grained fractions of both silicon carbide and binder, such as up to 0.1 mm. grain size, it being of importance, in addition, that the mechanical intermixing of the components is intimate.

EXAMPLE 1

As an example the manufacture on a full industrial scale of an electric resistance rod according to the invention will now be described in detail. This element can be used in oxidizing atmosphere at 1550° C. or higher without aging. The element is composed, as explained below, by a central incandescent zone and two terminal zones with a large cross-sectional area whereby special cooling devices for the terminal zones will be superfluous.

The manufacture is subdivided in the following steps, each of which will be treated individually:

Preparation of a mass for extrusion of silicon carbide.
Extrusion and drying of rods of silicon carbide.
Preparation of alloy powder.
Assembly of incandescent zone and terminal zones.
Infiltration.

Preparation of a mass for extrusion of silicon carbide

Green coarse crushed silicon carbide was further crushed and sieved until all of it had passed a sieve of 325 mesh. The crushing was performed in an edge mill. The powder was mixed a few hours in a kneader with an aqueous solution of an organic glue substance on the basis of cellulose ester which is called Modocoll M (a registered trademark) by the manufacturer, the Swedish corporation Mo & Domsjö Aktiebolag. The quantity of dry glue substance was 4% by weight of the silicon carbide and the additional water was 18 litres per kilogram of glue. The mixing was made at 50° C. which resulted therein that the water content was gradually reduced in the course of mixing. When the water content was reduced to about 8% of the weight of the mass the consistency had been suitable for the continued treatment and the mixing was interrupted. The mass was transferred to a vacuum mill in which it was subjected to a pressure of 20 millimeters Hg and forced to form a cylinder having a diameter of 50 millimeters.

Extrusion and drying of rods of silicon carbide

The pressed-out cylinders were introduced into a piston press and pressed out into long rods having a diameter of 8 and 16 millimeters respectively. The rods were cut into lengths of 400 and 200 millimeters respectively. The humid rods were dried in a climatic box at 40° C. and afforded then such a good green strength that they could stand, without any loss of substance, the continued treatment according to the description below. The volumetric weight of the rod was 2.24 gram/cm.$^3$ of which about 3.5% is glue and the balance, i.e., about 2.17 gram/cm.$^3$ silicon carbide. From this one may calculate that the silicon carbide skeleton of the dried rods contained about 35% pores. The object of the infiltration step now following is to fill out such pores or interstices entirely with an alloy having the composition $MoSi_2$. The glue substance in the dried shaped body is decomposed during the infiltration and leaves a small quantity of carbon which, however, is transformed into silicon carbide.

Preparation of alloy powder

Molybdenum disilicide which in known manner is manufactured by exothermic reaction between the elements is crushed to obtain the desired grain size of less than 325 mesh. Of the disilicide powder 90 parts by weight were mixed with 10 parts by weight of a 99% pure silicon also having a grain size less than 325 mesh. The powder mass was mixed in dry state.

Assembly of incandescent zone and terminal zones

A porous dried rod with a diameter of 8 mm. which is intended to be the incandescent zone and a second porous dried rod with a diameter of 16 mm. are ground at their abutting ends and provided with a peg and a bore respectively just matching therewith. The grinding of the dried mass is quite simple to carry out. Then the peg and the walls of the bore are moistened with a mixture of fine SiC powder and a thermosetting resin solution and rubbed for about one minute against one another until a good contact is obtained. The binding layer between the two rods consists now of uniform material of high viscosity. When this has dried there has been established a relatively strong homogeneous transition between the material of the two rods. Instead of glue there may be used plastic, if desired, admixed with silicon carbide powder and/or carbon powder. The opposite end of the incandescent zone blank is provided in a similar manner with terminal portion. A rod composed of these three parts is thus obtained. When dried the composite rod constitutes an element blank having an incandescent zone with a diameter of 8 millimeters and a length of 400 millimeters and two terminals of a diameter of 16 millimeters and a length of 200 millimeters each. The incandescent zone may be either straight or formed into hairpin or other shape before the plastic SiC-rod is dried.

Infiltration

The dried element blanks of silicon carbide are placed horizontally on a graphite support in a graphite trough. The graphite trough has a length of 800 millimeters and a wall thickness of 4 millimeters. In the bottom of the trough there is put the powder mixture of $MoSi_2$ and Si which is to be infiltered. The blanks are supported at a level above the powder layer to provide that they are spaced a few millimeters from the powder and are thus not in contact therewith. The support, on which the blanks rest, is constituted by a number of graphite edges with a mutual spacing of about 100 millimeters. The graphite troughs with their content of several blanks are then placed horizontally in a graphite tube furnace in parallel with one another.

The furnace is then provided with a graphite lid. This must not seal the troughs quite tightly because the gases formed must have their free escape. No special protective gas is required but in the production on a large scale it may be found suitable to conduct a current of carbon monoxide or argon through the furnace. To avoid overheating of those portions of the blanks which are positioned close to the furnace walls it is desirable that the corresponding graphite troughs do not touch the furnace wall directly but are held by distance pieces at the outer ends of the troughs at a distance of about 5 millimeters from the wall of the furnace tube. This has a length of 1600 millimeters and a wall thickness of 5 millimeters in the incandescent zone being of a length of 800 millimeters. The two terminal zones of the tube have a length of 400 millimeters each and a wall thickness of 10 millimeters.

The furnace tube is connected to a transformer of 50 k.v.a. The temperature will be increased in 45 minutes to 2100° C. and is maintained at that temperature for 30 minutes. The temperature measurement is made optically through an aperture in the one plug at the end of the furnace tube. Due to the development of smoke and gas during the action an exact temperature control in this way is very difficult to establish. By observing the setting of the transformer from one test to another the necessary exactness as regards the temperature may be assured also in the production on a large scale. The reading off may be assumed to be so uncertain that the actual temperature during infiltration may vary between the limits 1950° C. and 2200° C. When the furnace has cooled off which lasts for about 60 minutes the troughs are removed, the heating elements are ready for use after affixing terminal clamps or similar arrangements.

EXAMPLE 2

The procedure described in Example 1 was repeated substantially using a powder bed (minus 325 mesh) 10 mm. deep consisting of 95% $MoSi_2$ and 5% silicon by weight. Three preliminary bodies of cylindrical shape were treated, each having 35% pores and 65% by volume SiC. One of the bodies was mounted horizontally on supports so that its bottom surface just touched the top surface of the powder before heating. The second body, parallel thereto, was mounted 3 mm. above the powder surface, and the third (also parallel) 10 mm. above the powder surface. All three bodies were heated simultaneously in the furnace to a maximum temperature of 2100° C. for 1 hour, and then cooled to room temperature. The first body was substantially completely infiltrated but contained a rough surface caused by molybdenum silicide burrs. The second body was also substantially completely impregnated with molybdenum silicide but contained no burrs. Its surface was smooth. This showed that the powder had expanded on heating due to vaporization of the silicon into contact with the body, then receded due to depletion of alloy and excess silicon. The third body was not impregnated, showing that it had been mounted too far away from the powder to be contacted by the expanded body of the molten heated powder.

I claim:
1. A method for the production of heat-resistant and oxidation proof bodies of low porosity and consisting essentially of silicon carbide and molybdenum silicide, comprising the steps of shaping a preliminary porous body consisting essentially of at least one member of the group consisting of hexagonal SiC, cubic SiC, graphite, amorphous carbon, and carbon-containing carbonizable material, heating a molybdenum-silicon alloy in the presence of but not in direct contact with said preliminary body in a non-oxidizing atmosphere at a temperature above the melting temperature of said alloy but below the decomposition temperature of SiC thereby causing said alloy to expand so as to contact and infiltrate substantially all the pores in at least one coherent portion of said preliminary body with a part of said melted alloy.

2. The method of claim 1 in which said molybdenum-silicon alloy consists essentially of $MoSi_2$ and an excess quantity of Si and in which heating step said excess Si is vaporized thereby to produce an expansion of said alloy into contact with said body, and in which process said molten alloy recedes out of contact with said body due to depletion of alloy and excess silicon thereby to avoid the formation of molybdenum silicide burrs on the exterior surface of said body.

3. The method of claim 1 in which said alloy is in pulverulent form before being heated.

References Cited by the Examiner
UNITED STATES PATENTS

| | | | |
|---|---|---|---|
| 1,858,244 | 5/1932 | Laise | 29—182.7 |
| 1,906,963 | 5/1933 | Heyroth | 117—114 |
| 2,364,108 | 12/1944 | Swentzel | 29—182.8 |
| 2,752,666 | 7/1956 | Goetzel et al. | 75—203 |
| 3,036,017 | 5/1962 | Schrewelius | 106—44 |

FOREIGN PATENTS 791,323  2/1958  Great Britain.

ALFRED L. LEAVITT, *Primary Examiner.*
R. S. KENDALL, *Assistant Examiner.*